(12) United States Patent
Torres et al.

(10) Patent No.: US 9,014,920 B1
(45) Date of Patent: Apr. 21, 2015

(54) VEHICLE OCCUPANTS ALERT AND ALARM SYSTEM

(71) Applicants: Ricardo Torres, Santa Isabel, PR (US); Hansel Rios-Torres, Barranquitas, PR (US)

(72) Inventors: Ricardo Torres, Santa Isabel, PR (US); Hansel Rios-Torres, Barranquitas, PR (US)

( * ) Notice: Subject to any disclaimer, the term of this patent is extended or adjusted under 35 U.S.C. 154(b) by 119 days.

(21) Appl. No.: 13/804,640

(22) Filed: Mar. 14, 2013

Related U.S. Application Data

(60) Provisional application No. 61/690,605, filed on Jul. 2, 2012.

(51) Int. Cl.
| | | |
|---|---|---|
| *B60R 25/31* | (2013.01) | |
| *B60R 25/10* | (2013.01) | |
| *B60R 21/015* | (2006.01) | |
| *G08B 21/24* | (2006.01) | |
| *G08B 21/02* | (2006.01) | |
| *G08B 21/22* | (2006.01) | |

(52) U.S. Cl.
CPC ............. *B60R 25/31* (2013.01); *B60R 25/10* (2013.01); *B60R 21/015* (2013.01); *B60R 2021/01512* (2013.01); *B60R 2021/01575* (2013.01); *G08B 21/24* (2013.01); *G08B 21/0202* (2013.01); *G08B 21/0286* (2013.01); *G08B 21/22* (2013.01)

(58) Field of Classification Search
CPC ...... B60R 25/31; B60R 25/10; B60R 21/015; B60R 2021/01512; B60R 2021/01575; G08B 21/0202; G08B 21/0286; G08B 21/24; G08B 21/22
See application file for complete search history.

(56) References Cited

U.S. PATENT DOCUMENTS

| | | | | |
|---|---|---|---|---|
| 5,005,664 | A * | 4/1991 | Hoffmann ...................... | 180/287 |
| 6,768,420 | B2 * | 7/2004 | McCarthy et al. .......... | 340/573.1 |
| 7,170,401 | B1 * | 1/2007 | Cole ............................. | 340/457 |
| 7,348,880 | B2 * | 3/2008 | Hules et al. ................... | 340/522 |

* cited by examiner

*Primary Examiner* — John Q Nguyen
*Assistant Examiner* — Alan D Hutchinson
(74) *Attorney, Agent, or Firm* — Luis Figarella

(57) ABSTRACT

A system and method uses a combination of sensors and electronics to reliably remind forgetful or negligent caregivers when they have or are about to leave one or more helpless occupants inside a vehicle, in addition to functioning as a traditional car alarm. One or more detectors sense the presence of the helpless occupant and the departure of the driver, at which time an ascending level of alarms are executed.

6 Claims, 14 Drawing Sheets

VEHICLE OCCUPANTS ALERT AND ALARM SYSTEM

CROSS-REFERENCE TO RELATED APPLICATIONS

This application claims priority to U.S. provisional patent application Ser. No. 61/690,605 titled "Passengers in Danger Alert and Alarm System" filed on Jul. 2, 2012, the disclosure of which is herein incorporated by reference in their entirety.

PATENTS CITED

The following documents and references are incorporated by reference in their entirety, Saban (U.S. Pat. No. 8,190,332), Davisson et al (U.S. Pat. No. 8,058,983), Viksnins et al (U.S. Pat. No. 6,922,147), Thornton (U.S. Pat. No. 5,793,291), Sweeney (US Pat. Appl. No. 20070222622), Mesina (US Pat. Appl. No. 20040164856) and Edwards et al (US Pat. Appl. No. 20030098792).

FIELD OF THE INVENTION

The present invention relates in general to an apparatus and system for implementing a car alarm system, and more particular to a car alarm system suitable to protect the vehicle while at the same time protecting and reminding drivers about the danger of unattended small children and animals accidentally left in the vehicle.

DESCRIPTION OF THE RELATED ART

Sadly, there have been many incidents where unattended children, babies or pets are mistakenly left in unattended vehicles resulting in their deaths. Much more prevalent, is the case of cars being accidentally locked, with the children/infant/pets being left inside (including this correspondent's), resulting in the expense of a locksmith opening the vehicle.

Various attempts can be seen in the art, Saban (U.S. Pat. No. 8,190,332) is a system that detects if the child is on the car seat, triggering the alarm. Its system has a sensor/processor on the car seat which is connected to the other systems on the vehicle. This is inefficient to install, and besides while it alerts people around the vehicle, does nothing to enable access to the occupants inside the vehicle.

Mesina (US Pat. Appl. No. 20040164856) teaches a system having a sensor inside the seat belt clip which would trigger the alarm and send a signal to a receiver that the driver would have. Again, a separate apparatus from the vehicle components, generating no efficiency. As an example, it detects when the seat belt is in use but is not effective if the child is just sitting on the car seat. In addition, it uses a wireless signal which can be damaged by interference from the many signal transmitted daily. It is intended for only one child seat and it doesn't ensure any access to the vehicle or access to the baby.

Sweeney (US Pat. Appl. No. 20070222622) teaches a proximity detection system which alerts the driver if the sensor in the child seat is not deactivated. It alerts when the device on the driver gets away from the device under the child's body. But that does not take into account the social tendency to leave behind material not commonly within the wallet or keychain. In addition, Sweeney requires an extra antenna on the vehicle to send a signal to the driver's device.

Thornton (U.S. Pat. No. 5,793,291) teaches a system to detect movement in a car when it is parked, but does not specify what kind of sensor would be used for adaptation to detecting babies.

What is lacking in the arts is an integrated baby safety system attached to the same module as the vehicle alarm system and that uses electronic communication to the baby/infant/pet sensing processing unit to determine the actions of the associated vehicles systems as a whole, while being intended for all kind of helpless passengers, including opening door locks if the key is forgotten inside the vehicle.

SUMMARY OF THE INVENTION

This section is for the purpose of summarizing some aspects of the present invention and to briefly introduce some preferred embodiments. Simplifications or omissions may be made to avoid obscuring the purpose of the section. Such simplifications or omissions are not intended to limit the scope of the present invention.

In one aspect, the invention is about a helpless occupant and vehicle alarm system comprising, one or more vehicle conditions sensors, a system operator processor unit for installation on a vehicle, said unit interfaced electrically with said one or more vehicle conditions sensors, said unit monitoring their status and executing one or more pre-programmed action sequences in response to said sensor conditions, a portable remote pager unit in communication with said processor unit, said portable unit being capable of encrypting said communication signals, and being capable of activating the system, disabling the system or activating a panic mode, providing visual and/or aural messages to operator, electric circuitry control means for isolating the vehicle's power door lock circuitry from the vehicle's control, so that said processor unit may exclusively control said door locks and system means capable of discerning between helpless occupants alarms and vehicle theft situations and activating various system features accordingly.

In another aspect, said vehicle condition sensors comprise one or more removable sensors connectable to one or more seats in order to detect the presence of an occupant on said seat. In yet another aspect said seats are comprised of child seats. In another aspect, said system processor unit is capable of detecting when one or more helpless occupant sensors are triggered after they were considered unoccupied, and respond as in a theft event.

In another aspect, the invention is about a computer-implemented helpless occupant and vehicle alarm protection method, said method comprising providing one or more vehicle conditions sensors, installing a system operator processor unit on a vehicle, interfacing said unit electrically with said one or more vehicle conditions sensors, said unit monitoring the status of said condition sensors and executing one or more pre-programmed action sequences in response to said sensor conditions, providing a portable remote pager unit in communication with said processor unit, said portable unit being capable of encrypting said communication signals, and being capable of activating the system, disabling the system or activating a panic mode, providing visual and/or aural messages to operator, installing electric circuitry control means for isolating the vehicle's power door lock circuitry from the vehicle's control, so that said processor unit may exclusively control said door locks, and providing system means capable of discerning between helpless occupants alarms and vehicle theft situations and activating various system features accordingly.

In another aspect, said vehicle condition protection method comprises providing one or more removable sensors connectable to one or more seats in order to detect the presence of an occupant on said seat. In yet another aspect, said seats are comprised of child seats. In another aspect said provided system processor unit is capable of detecting when one or more helpless occupant sensors are triggered after they were considered unoccupied, and respond as in a theft event.

In one aspect, the invention is about a computer readable medium having a computer program stored thereon comprising instructions that, when executed, operate to cause a computer to perform operations comprising, monitoring one or more vehicle conditions sensors, a system operator processor unit interfacing electrically with said one or more vehicle conditions sensors, said unit monitoring their status and executing one or more pre-programmed action sequences in response to said sensor conditions, a portable remote pager unit in communication with said processor unit, said portable unit being capable of encrypting said communication signals, and being capable of activating the system, disabling the system or activating a panic mode, providing visual and/or aural messages to operator, electric circuitry control means for isolating the vehicle's power door lock circuitry from the vehicle's control, so that said processor unit may exclusively control said door locks and system means capable of discerning between helpless occupants alarms and vehicle theft situations and activating various system features accordingly.

In another aspect, said vehicle condition sensors comprise one or more removable sensors connectable to one or more seats in order to detect the presence of an occupant on said seat. In yet another aspect said seats are comprised of child seats. In another aspect said system processor unit is capable of detecting when one or more helpless occupant sensors are triggered after they were considered unoccupied, and respond as in a theft event. In Other features and advantages of the present invention will become apparent upon examining the following detailed description of an embodiment thereof, taken in conjunction with the attached drawings.

Figure 1A:
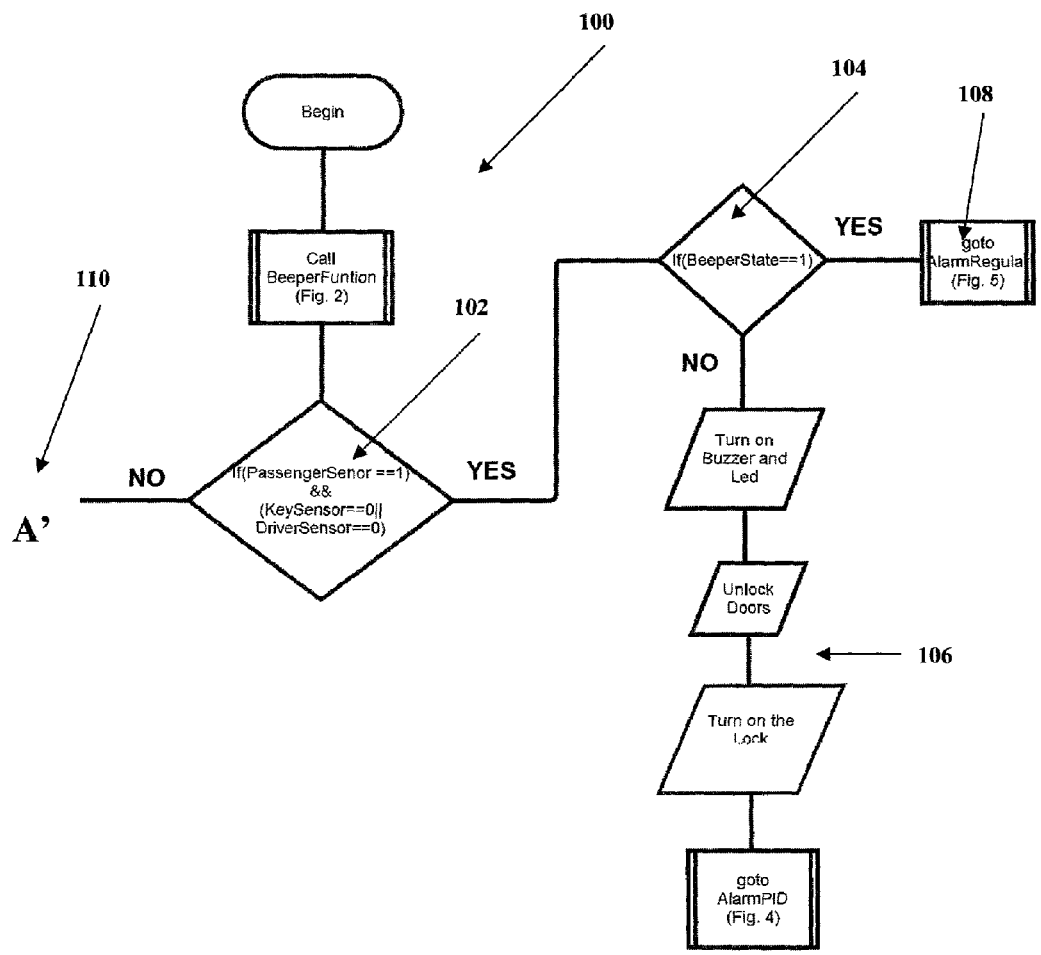
FIGS. 1A-1B show a flow diagram of the initial system verification, according to an exemplary embodiment of the invention.
Figure 1B:
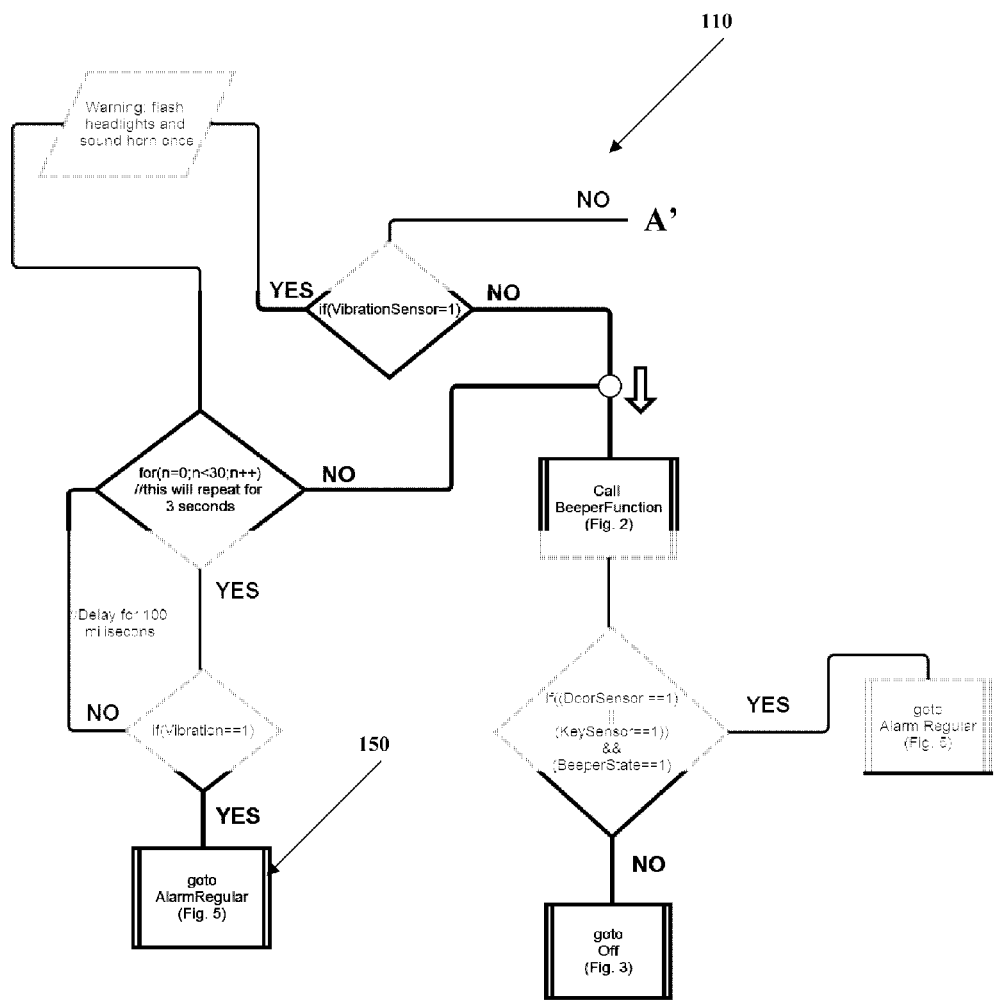

The above-described and other features will be appreciated and understood by those skilled in the art from the following detailed description, drawings, and appended claims.

DETAILED DESCRIPTION OF THE PREFERRED EMBODIMENT

To provide an overall understanding of the invention, certain illustrative embodiments and examples will now be described. However, it will be understood by one of ordinary skill in the art that the same or equivalent functions and sequences may be accomplished by different embodiments that are also intended to be encompassed within the spirit and scope of the disclosure. The compositions, apparatuses, systems and/or methods described herein may be adapted and modified as is appropriate for the application being addressed and that those described herein may be employed in other suitable applications, and that such other additions and modifications will not depart from the scope hereof.

All references, including any patents or patent applications cited in this specification are hereby incorporated by reference. No admission is made that any reference constitutes prior art. The discussion of the references states what their authors assert, and the applicants reserve the right to challenge the accuracy and pertinence of the cited documents. It will be clearly understood that, although a number of prior art publications are referred to herein, this reference does not constitute an admission that any of these documents form part of the common general knowledge in the art It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

A major goal of the present invention, is to alert the vehicle operator, driver and/or people around the vehicle area that a child, baby, handicapped person or pet has been inadvertently forgotten in the vehicle through sound, voice and/or visual signals inside and outside the vehicle. Because such a system would directly interface with the vehicle system, it could automatically open the door locks and alert selected individuals (including the driver or designated person) that a helpless vehicle occupant has been detected after the key has been removed from the key hole, driver's seat belt has been disconnected or a weight sensor on the driver seat detects it. Such a system would then not allow the locks to close if such a condition does not change. Even when the alert has being ignored, the vehicle's alarm system will activate, alerting the operator or other people around the area of the vehicles location that one or more child has been left alone in the vehicle. It is designed to detect more than one helpless passenger.

Figure 2A:
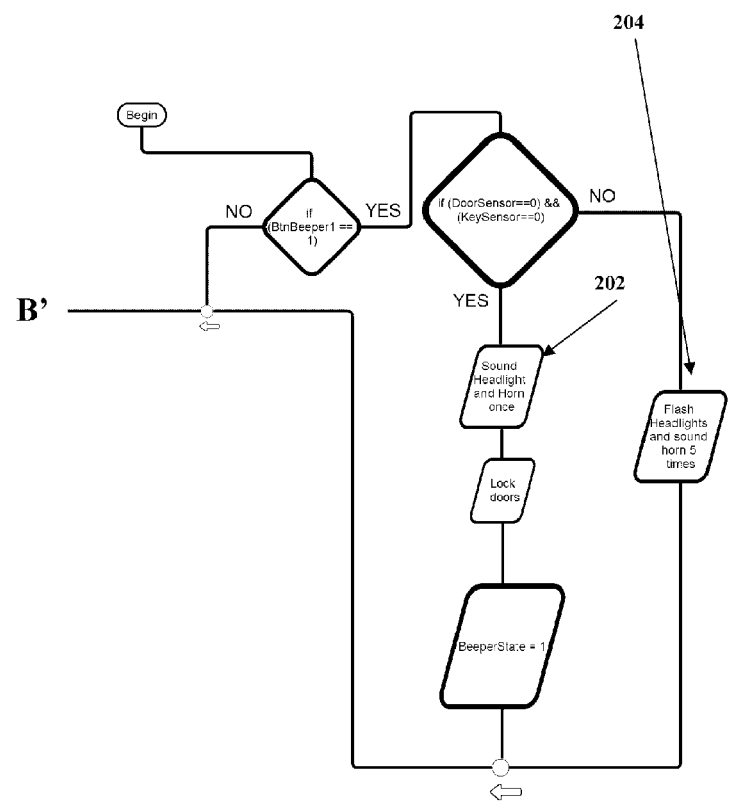
FIGS. 2A-2B show a flow diagram of the FOB/Beeper functionality, according to an exemplary embodiment of the invention.
Figure 2B:
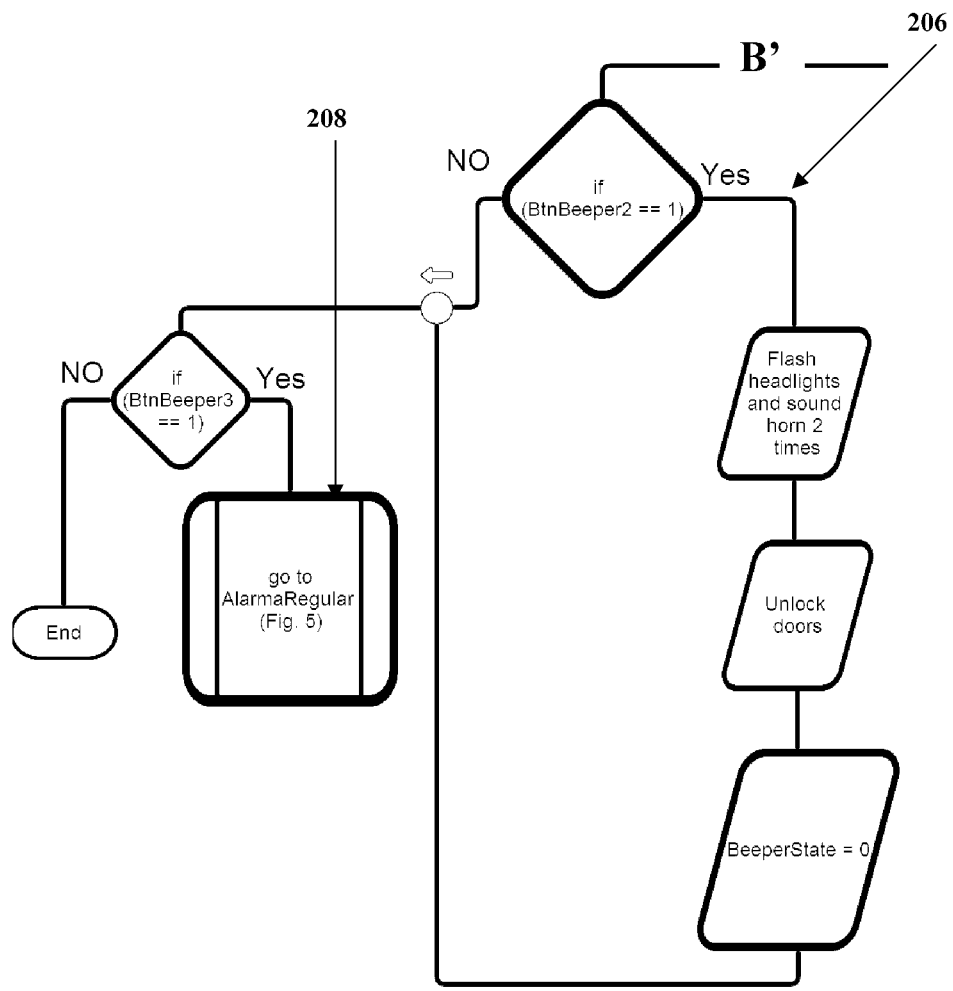
Figure 3:
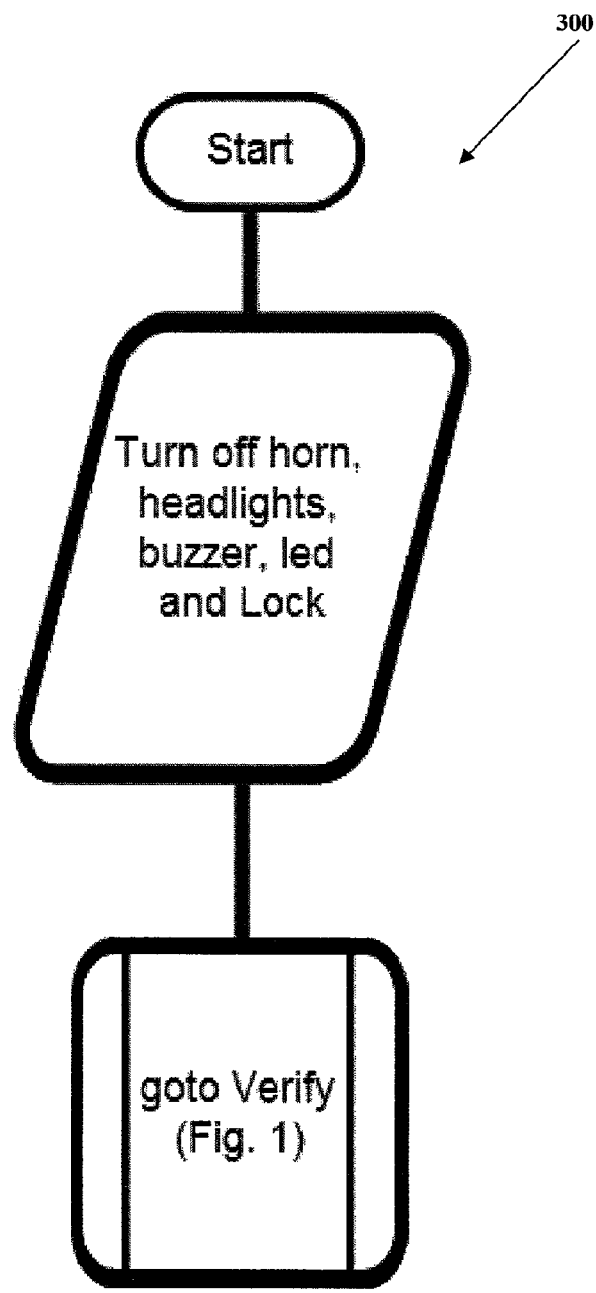
FIG. 3 shows a flow diagram of the end of the system program, according to an exemplary embodiment of the invention.
Figure 4A:
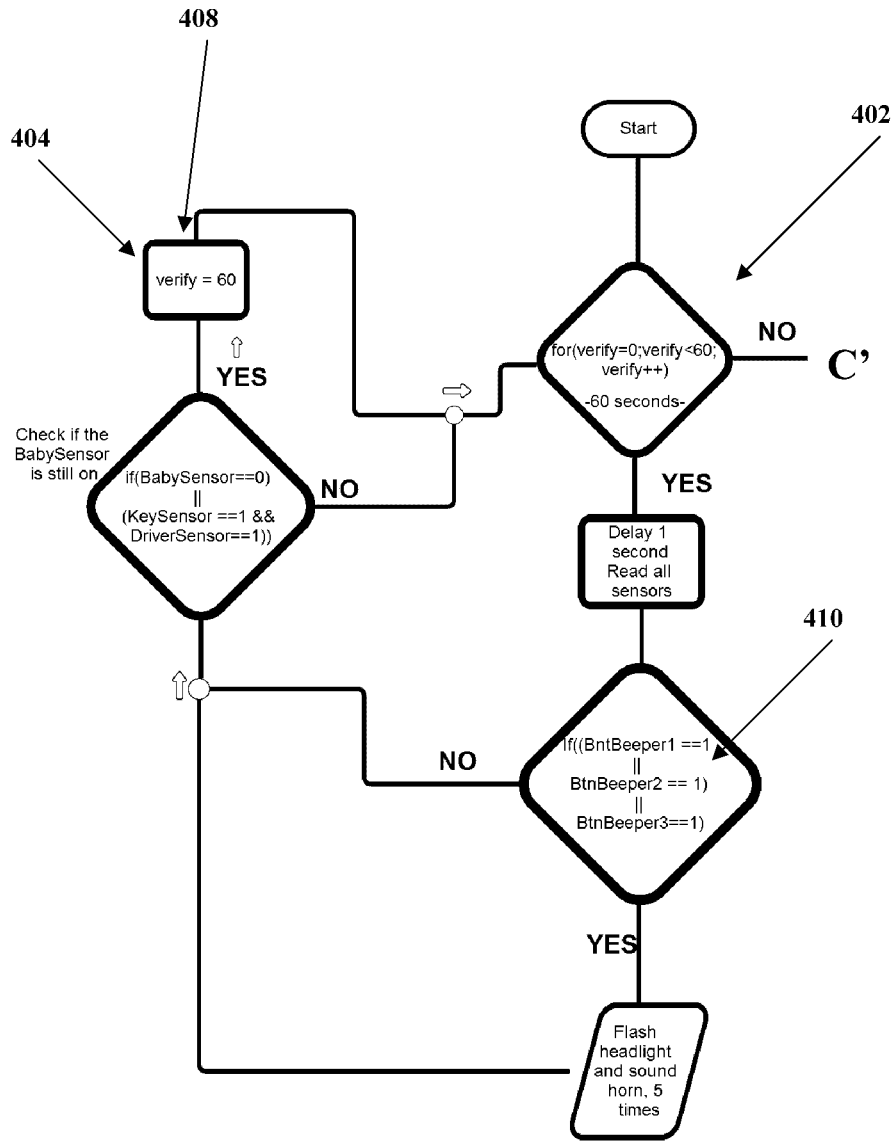
FIGS. 4A-4B show a flow diagram of the occupant-in-danger or Person-in-Danger (PiD) flow, according to an exemplary embodiment of the invention.
Figure 4B:
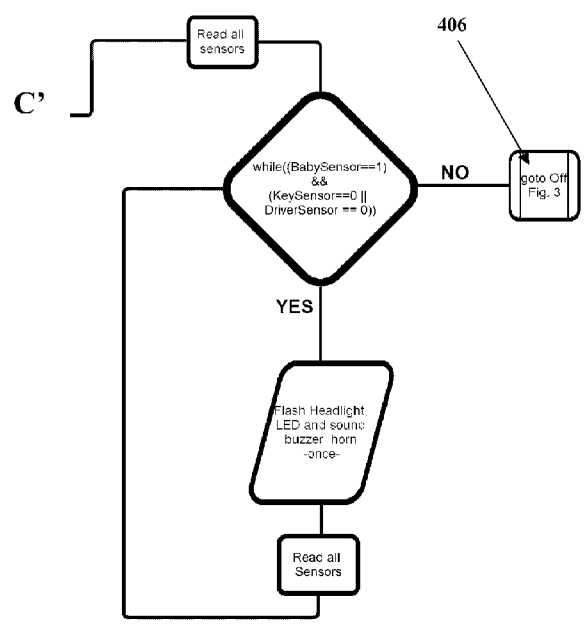

Referring to FIGS. 1A-1B, 2A-2B, 3, 4A-4B, 5A-5B provides flowchart explanations of the system software executed on the system processor. To begin with, the system status is determined by input from a pager or beeper (which may be a key FOB, traditional beeper and or a telephone app (via either the Bluetooth, Onstar, SMS, internet or any other appropriate handset interface). In this fashion, if the system (whether at power up or during any other moment) detects that the system determines (via seat sensor, IR sensor or any other suitable vehicle occupant detection means) if there is a helpless occupant (child, pet, or any other suitable being), that is there is a helpless occupant detected 102 (Passenger Sensor==1) while simultaneously the car keys are not in the ignition and there is no driver, the system proceeds to warn the driver via the beeper as a low mode alarm. In this mode 104 mode if the car alarm is not activated, then the system proceeds 106 to turn on the beeper buzzer and LED (or phone display) as well as inside the vehicle, unlock the vehicle doors (via the Power locks mechanism of the vehicle), disable via the H-bridge switch all vehicle power lock buttons (so that keys may not be locked inadvertently), then go to the Alarm PID (Person in Distress) mode (FIGS. 4A-4B).

If a helpless occupant is detected after a programmable amount of time has elapsed 108 (for example 3 seconds), the incident is treated as a "trick" or irregular child detection, and the system proceeds to treat the occupant detection as a theft event 150. This is critical so that the door opening feature intended to save lives is not used by thieves to gain unauthorized entry into the vehicle.

Figure 5A:
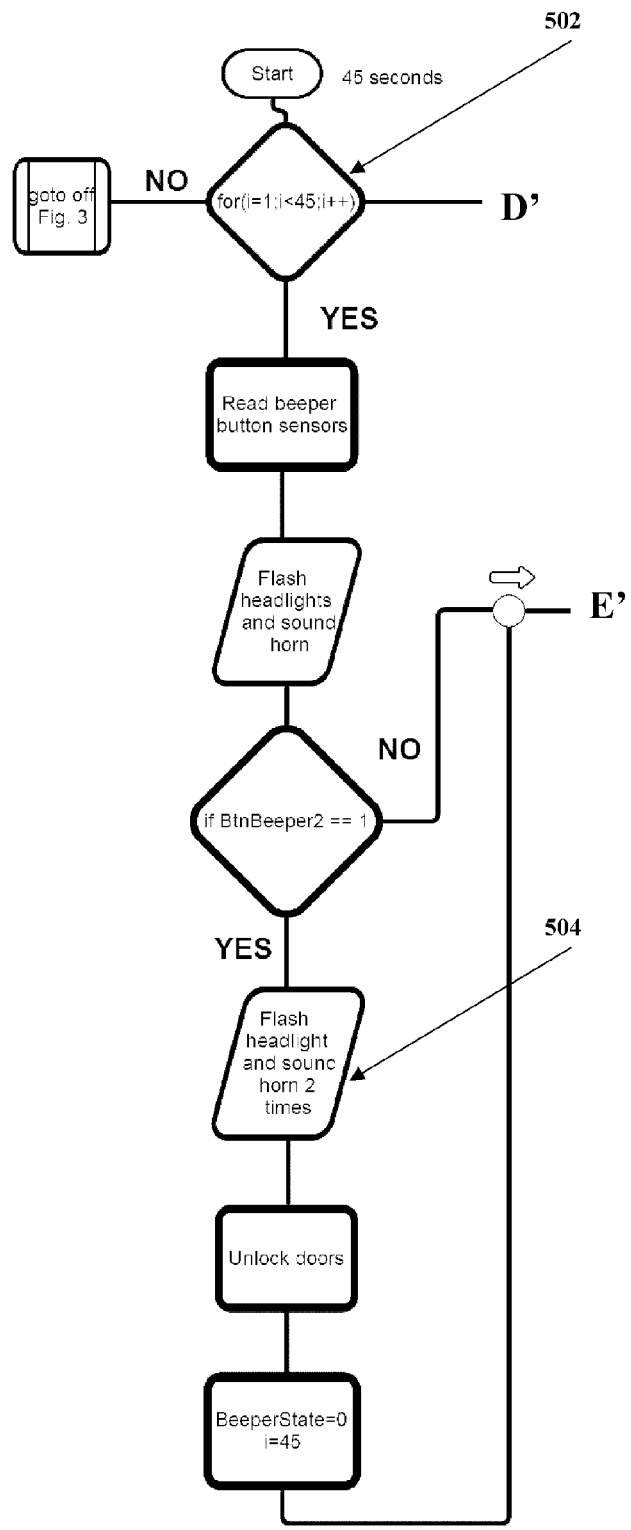
FIGS. 5A-5B show a flow diagram of the regular theft alarm functions, according to an exemplary embodiment of the invention.
Figure 5B:
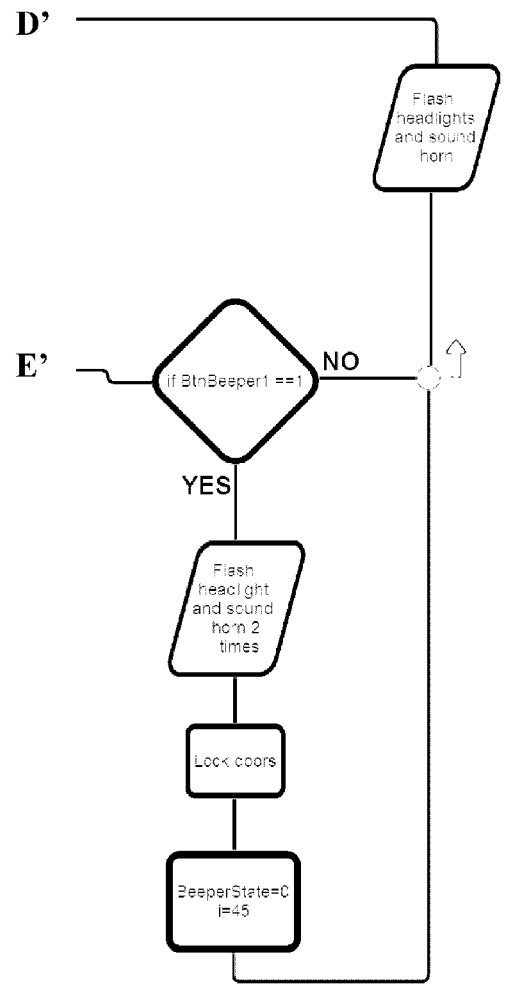

Similarly, if the system detects any vibration in the vehicle, either because a window pops, or the vehicle is rocked, the horn sounds once. If there is any other vibration felt again in the span of three seconds, the alarm goes into regular alarm mode 150 (FIGS. 5A-5B). Similarly, if during this period a key in the ignition is detected, or the doors are opened while the status of the alarm is on, the regular alarm is activated to prevent theft. Throughout this time, the system is constantly checking the beeper for any user input, as a regular car alarm would do.

Referring to FIGS. 2A-2B and 3, we see the primary state of the system in response to the proposed three buttons in the pager. In effect, the system runs a continuous loop function reacting to the pressing of either button one 602, two 604, or three 606. When button one 602 is pressed, the system checks to see if either a key is in the ignition (or in the case of RFID or NFC keys, if one is within the range of the vehicle sufficient to allow engine start), and/or whether the doors are unlocked or a door open. If any are true, the pager and/or the key horn are sounded five times in quick succession 204. If none are true (key is out and the doors are closed or locked), the horn is sounded once and the theft alarm is armed 202. The interface between the pager 600 and the system is encrypted to ensure that two similar units next to each other (but related to different vehicles) do not crosstalk.

When the second button 604 is pressed, the vehicle horn and lights are activated twice quickly 206, doors are unlocked and the theft alarm deactivated. When the third button 606 is pressed the system simply activates the theft alarm 208. When no buttons are detected, the system disarms 300.

Referring to FIGS. 4A-4B we see the process through which the system verifies that an Occupant-in-danger (or Person-in-Danger PiD) mode is still valid. After activation of the PiD (say because of condition 106) the system initially enters a warning period 402, where it constantly checks all sensors (in one embodiment for 60 seconds, although the time may be reprogrammed) to see if the occupant is still in danger and/or unattended. The occupant is considered endangered among other times when one or more of the passenger sensors are on while the key is off the ignition and the driver sensor states he/she is not present). When the passenger is relieved from danger (key is inserted, driver seat is occupied, or the occupancy sensor states the passenger is no longer on board 404), the system exists the verification period 406. If the passenger is considered to still be in danger, in one embodiment, the system continues to monitor for an additional 60 seconds 408, although as with the other periods of time, any other desired amount may be programmed into the system at either the time of mfr., or with a software update.

In one embodiment, if within this monitoring period of 60 seconds, it detects that a beeper button pressed, the system only turn on the lights and horn 5 times to warn the driver that there is a danger 410 while additionally preventing the closing of the doors while the passenger remains in the vehicle. At the end of the 60 seconds of verification, and while there is still a passenger in danger; the lights, horn, buzzer (small speaker in the vehicle) and the LED light will turn on and off.

Referring to FIGS. 5A-5B, we see the system behavior during a traditional theft condition. During this process, the lights and the horn of the car, turn on and off for 45 seconds (again, random time, programmable in other embodiments). Upon completion of the 45 seconds 502, the system turns off. The system constantly checks if some of the first 2 buttons 602, 604 are pressed in the beeper, and if so, turns off the alarm. If the second button 604 is pressed, the horn and lights light up quickly 2 times, doors are unlocked, and the theft alarm is deactivated. Pressing the first button 602 also disarms the alarm from sounding, but locks the doors 504, while keeping the alarm status active. If either of the above warnings are ignored for more than 60-90 seconds (also programmable), the alarm system and unit speaker issue warnings about the situation.

Passenger sensors connect under or around the back seat. These connectors can be varied, from two or three in sedans, to four to ten in "minivans" or vans, even more in school buses used in childcare, nursing homes and other applications. Failure to connect the sensors (or accidental disconnects) will not disable the theft alarm functions, or the functioning of other sensors. When no sensors are connected, and the button specific to the child alarm is pressed, the system responds with an error code through the buzzer, FOB, car horn, car messaging system and/or any other anomaly warning system, to ensure the driver knows that while the helpless occupant alarm is desired, it is presently disabled.

There is no need to remove the occupant sensors when leaving the vehicle. However, as noted before, there is the risk that thieves might try to introduce some object into the vehicle to activate the occupant sensor and open doors. However, when something like that happens after the occupant was not senses, the system will immediately alerting the anomaly alarm but not open the door. This function can also be used to install other sensors such as motion sensors, sound, light or proximity, etc., for monitoring possibilities of theft from the vehicle interior in cases where any other theft prevention sensors fail.

The system includes the regular features of an alarm. Shock sensors, electret microphones (to detect destruction of crystals), kill switches, siren speaker system, control lights, doors and trunk detection sensors, Power door lock control and a pager. In one embodiment, the pager 600 performs the regular functions of an alarm. That is, it 1) Open Locks and deactivate alarm 2) Closes locks and activate the alarm 3) Serves as a Panic button.

Other possible applications (which may be simple to implement depending on the model or brand of vehicle it is installed on) are: 1) Opening the trunk or slide doors, 2) Starting the vehicle remotely and 3) communicating "Two Way" between the vehicle and the beeper or user cell phone, such as the vehicle sending an alert to the pager. In addition, the system may be modified for "Smart Keys" (RFID/NFC), so that detecting the presence of the key in the vehicle and the driver's belt, pocket or other nearby location is taken as having the key "in the ignition".

Figure 6:
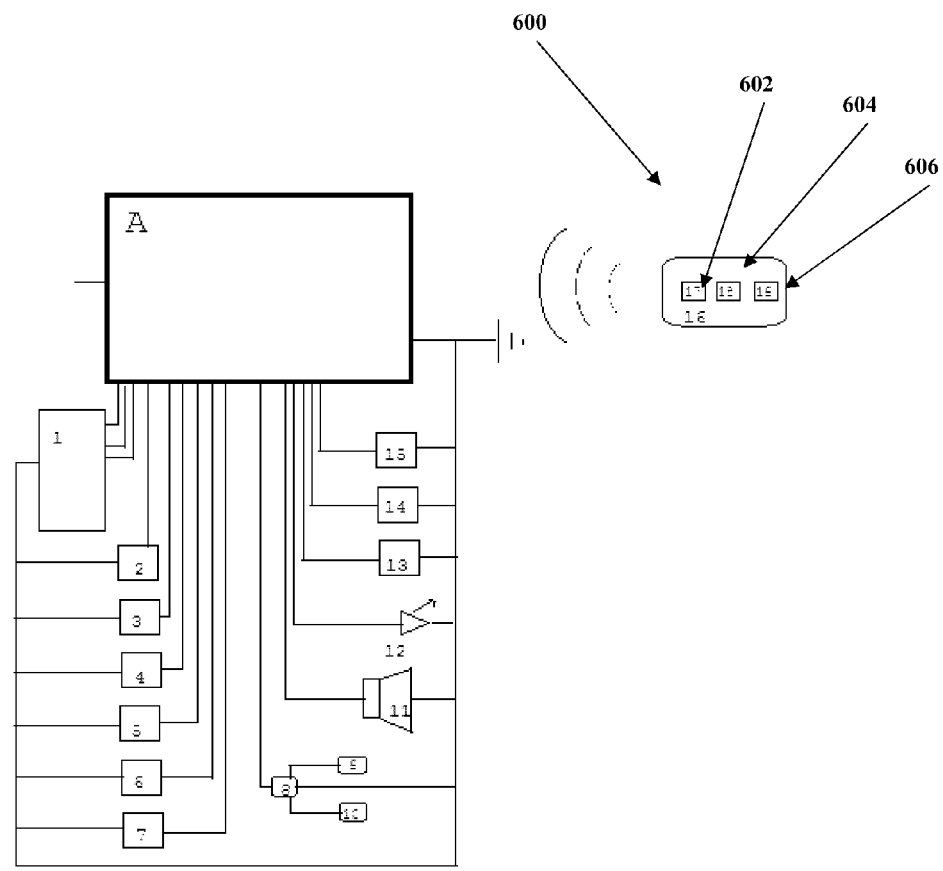
FIGS. 6-7 show components of the alarm system electrical diagram, according to an exemplary embodiment of the invention.

Referring to FIG. 6, we see one embodiment having a single unit for the security system, management beeper doors and new features. The receiver also has the beeper signals the functions explained above within the device as described through the respective circuits. In an alternate embodiment, some of the sensing functions may be added to the vehicle's computer or other systems, so that the complete system need not run on a single "box", and functions are handled by various components.

Figure 7:
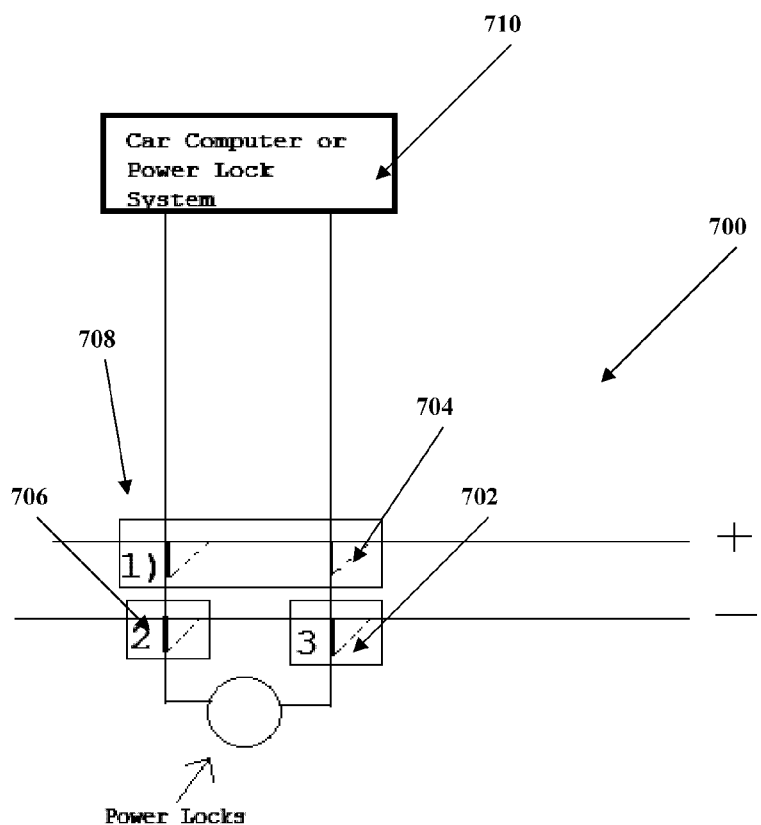

Some of the components seen in FIG. 6 include; monitoring burglary parts 1, including any or all of electret microphones, shock sensors, pressure sensors, tilt sensors and others. This also includes a "kill switch" or short circuit so that the car does not start. Door locks disabling circuitry 2. In one embodiment, FIG. 7 this part of the circuit includes an H-bridge electric circuitry means that causes door locks to become un-responsive to any commands from the car computer commands, buttons on the car doors or separate vehicle FOBs. In an alternate embodiment, these H-bridge functions may be accomplished in software within the vehicle remote control software. Any of these can then be manipulated through the H-bridge relay described above or if the system is in within the vehicle's computer programming. Such security also serves to isolate the open and close safe from any vehicle control, which avoids damage to the door lock circuits. Once this is enabled, upon receipt from the beeper signal, opening the doors or closing them. When the system unlocks the doors 106, powered window vehicles will also have the windows opened a crack to create a small air flow in cases where the alarm has been activated.

Driver presence sensors include key in the ignition (or RFID/NFC FOB nearby) as well as the weight sensor within the seat, the motion sensor or the vehicle belt. All common in activating the Air bags. Sensors for detecting the helpless occupant include circuits to child seat (which include baby seats as well as booster seats) sensors, IR, motion, etc. Finally, buzzers, prerecorded voices and LEDs are located on the dashboard or driver's area for quickly notification to the driver that the passenger is in danger or defenseless. Similarly, the vehicle headlights and horn may be activated as a warning of danger. The pager itself, in one embodiment has three buttons. One to open the car 602 (and disable the alarm), the second 604 to close it (and activate the car alarm), and a third 606 to act as a panic button.

The H-bridge 700 (FIG. 7) ensures that the power locks are not damaged, and that the occupant safety has precedence over the normal vehicle functioning. The parallel switches 702, 704, 706, 708 enable the complete disconnection from power of the vehicle signals 710 when the alarm is powered. When the PID alarm is disabled, the switches are disabled, connecting the vehicle signals 710 as original. In this fashion, when the alarm is activated, if a user tries to "lock the doors" by bypassing the pager (or manually pressing the door buttons).

Figure 9:
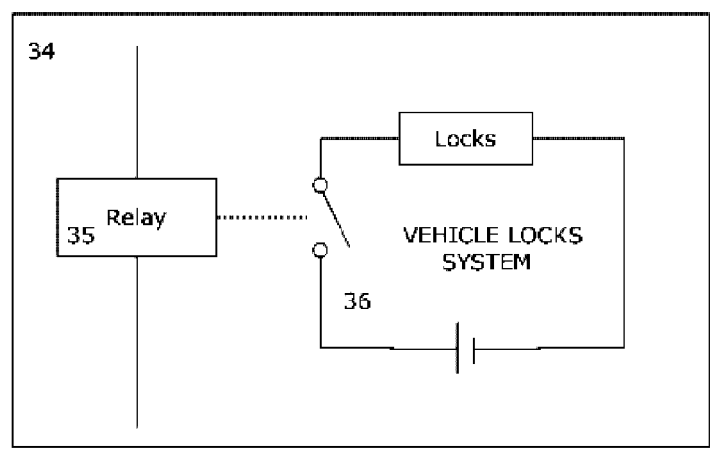
FIG. 9 shows the vehicle locks system connection with other system circuits, according to an exemplary embodiment of the invention.

In one embodiment, if the driver is detected as moving out of the car and the child/infant/pet is sitting, the door locks (FIG. 9) will open and/or not be allowed to close until the child is sensed as being outside the vehicle, or the driver is back in the vehicle again (as sensed by the driver/occupant sensors). This will prevent the child to be locked inside the vehicle, independent of where the keys are located. Note that similarly, the alert system (FIG. 10) would activate. If there are no occupants left within the system, the system will continue monitoring.

In one embodiment, the system will wait a preprogrammed amount of time (in one embodiment one minute) after time has elapsed to verify if the child is alone in the vehicle. If true, all the alarm systems (34, 38, 41 and 43) will be activated in different timed loops for each one. In one embodiment, the voice will be alerting loudly, as well as the car alarm and/or horn, the vehicle lights will be signaling and the door locks will open. If/when this condition changes all the loops will stop and the vehicle can be secured. If the condition changes before the time elapses, the time count down will stop making the system to return to the normal functions of the car alarm. The system will ensure the alarm system is off and will redirect the process as required.

The system program is always monitoring one or more of the helpless passenger sensors (49, 51) are on while the driver presence sensors show no driver. The LED Light in/near the dashboard 36, buzzer or voice alert on FOB will be activated and the vehicle lock system will unlock all doors. In one embodiment, a programmable period (say one minute) must elapse before the horn, light and speaker systems activate (38, 41, 43). In that period of time the user must retrieve the baby from the car seat, otherwise all the alert signals previously mention will activate in a repeating cycle. The system will not stop the alarm and alert signals until either the baby(ies) or other occupants are taken out of the vehicle or the driver is detected as in the vehicle. The vehicle's keys FOB or other alarm system beeper will not deactivate these functions of the system, and won't let the doors locks close. After the child is retrieved from the seat the alarm will act as normally a car alarm system works, monitoring the car security and seats constantly.

Other Functions of the system may include all/part of the traditional car alarm functions, however certain system functions may operate as follows. In one embodiment all or some of the following conditions may be observed; the vehicle alarm beeper will not be able to shut down the alarm signals when a helpless passenger is in danger; the locks will not stay close if a helpless passenger is in the vehicle and the driver is not; the beeper will not lock the doors if the passengers in danger is still in danger; if the beeper commands the system to lock the doors and activate the security functions and the passenger in danger is inside the vehicle the system will activate a vehicle's horn or any other exterior buzzer in a short loop as a notification of danger. When a helpless passenger, child, baby, pet or not in danger the normal security functions will be activated as normal.

In a critical difference to other systems, after a certain amount of time has elapsed (programmable) without sensing an occupant, the system will ignore any child occupancy alarms. This is critical in preventing any unscrupulous person from using the safety features to obtain unauthorized access to the vehicle. For example, a thieve could poke the weigh sensor on an un-occupied child seat and cause the system to open the doors. In such an occurrence, none of the door/window opening functions occurs, while the sound, lights and messaging (separate one, alerting the commission of a crime) are activated.

Due to this reason, the system includes all/most of the functions associated with a car alarm anti-theft functions, including shock sensors, electrets or similar microphone (to detect window glass cutting or breaking tools), vehicle current cutoff, horn, lights, door and trunk openings, power lock, vehicle auto-start.

In addition, any key FOB or beeper will have all the traditional functions, including opening/closing of locks/doors, activation/deactivation of both occupant and/or theft alarms, panic or other security alarm. Other enhancements include trunk opening, remote vehicle start, two way communication between the beeper and the vehicle. In an alternate embodiment, a button inside the vehicle may be used to deactivate the system as a lost beeper procedure.

Figure 8:
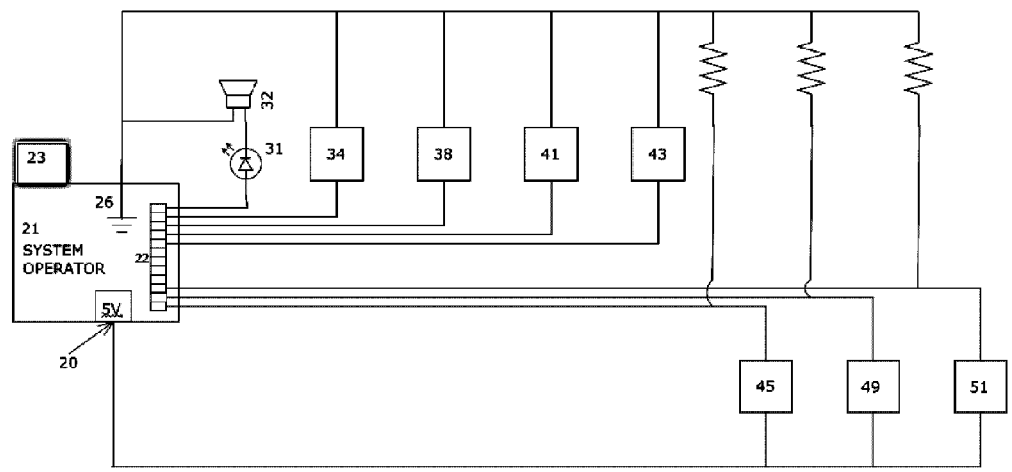
FIG. 8 shows a vehicle alarm system electrical diagram, according to an exemplary embodiment of the invention.

Referring to FIG. 8, we see in one embodiment a system operator processor board 21. Said system operator board 21 is powered by a System Operator Board Power Supply 23 which contain the software program described. Such a program controls the overall system operation, and will receive all or some of the information from the input devices; including operator or Driver sensor 45 which detects the presence of the driver. Such sensing may be accomplished by adding a sensor to the seat, keyhole, Smartkey proximity sensor and/or combination of these. Note that in one embodiment, the above may be accomplished by interfacing with the already installed airbag seat sensor. The one or more car seat sensor(s) 49 detect the presence of any passenger sitting in the car seat(s). Additional car seat sensors 51 detect the presence of any other passenger or pet sitting in the car seat.

In one embodiment, the above sensors provide a series of conditions that activate the following output devices depending on the conditions and programmed responses in the firmware. These include LED lights in dashboard 31, speaker or buzzer inside the vehicle 32, relay to vehicle lock system 36, relay to vehicle horn system 41, relay to vehicle lighting system 43, and/or relay to vehicle speaker system 38.

In one embodiment, other sensors that may interface with the more common car alarm functions include a FOB receiver or beeper detector (portable status indicator), movement and vibration sensors, door and trunk lid sensors. In one embodiment, the system uses the same relay connections of said alarm system (36, 38, 41, 43) to interact with the independent vehicle system car alarm. In an alternate embodiment, Light Emitting Diode (LED's) or other similar sensors may be used to detect doors, trunk, windows and other systems operations.

The system operator processor 21 is a processor assembly circuit where the control program is located, acting as a brain to the system which monitors and detects the conditions that will trigger the mechanisms of alert and alarm. This device will have installed vehicle alarm system functions or will have the space to add alarm functions as demanded by the manufacturer and costumer if complex functions are demanded, as seen through connector 22. From this connector the interface to input/output devices will be performed, including the extra sensor a regular car alarm needs.

Referring to FIG. 8, we see in one embodiment a connector to the power source for the system 23, the system ground 26 (linking the circuit board power supply for the components of the system). The sensor components that will detect the presence of the driver and any passengers (45, 49, 51). As noted above, the driver's sensor may be located on the keyhole, the seat itself, the steering wheel or ignition as a touch, pressure, movement or on/off sensor, in cases where two are used (say key and seat belt sensors). When a Smart key or FOB presence sensor is employed in the vehicle, the ignition sensor status may be tapped, or the system may be modified to have a separate Smartkey sensor only for occupant safety functions. In an alternate embodiment, the Start/Stop switch status may be monitored, as the actuation of the engine start state may be enough to indicate vehicle presence.

The sensors enabled to detect de presence of the passengers 49, 51 may be disconnected off the system in order to change the type of sensor, given the preference of the vehicle manufacturer, vehicle purchaser/operator, state or local ordinances, etc. In this fashion, such sensors may have a plug in connection for such convenience. In one embodiment, such a plug may be located under the seats, around the side, backseat, etc., to ease the clutter when a particular car seat or sensor is not in use.

As seen in FIG. 8 one or more output devices 31, 32 may be used to warn about the presence of a child or infant on the vehicle. One is an LED, lamp or visual signal to be located on the dashboard or other easy to see sight location 31. A sound or pre-recorded voice device 32 may also be used. These could activate when the system detects that the driver is about to leave the car and the infant/child/pet is still within it. At such a time, the system will start a countdown to determine if the occupant is in danger.

A critical system component is a connection to the door locks system 34. Such a connection FIG. 9 would prevent the door or doors to be locked by anybody (including the driver remote key) if the driver's sensor 45 detects that he/she is leaving the vehicle with the occupant still within it. This connection 34 includes a relay 35 that connects this circuit to the vehicle's locks system circuit. If the vehicle doesn't have a door lock system an alternative system may be implemented by the system operator 21.

Figure 10:
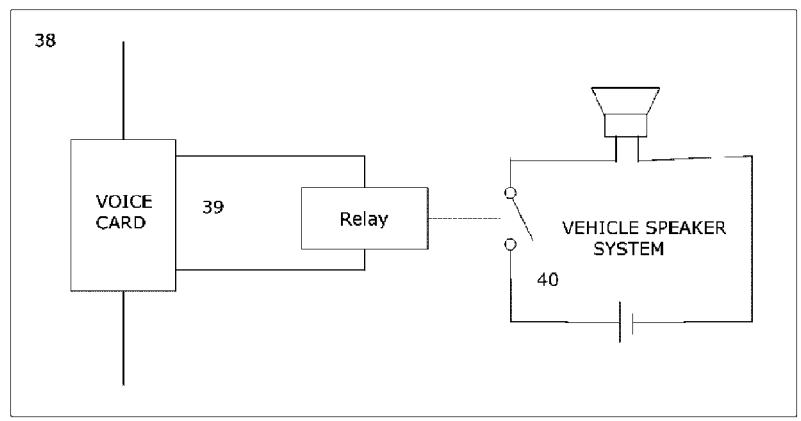
FIG. 10 shows the voice alert system connections with other system circuits, according to an exemplary embodiment of the invention.

The voice signal device connection 38 may be better appreciated in FIG. 10. In one embodiment, the voice system is connected to a speaker which would alert the driver/operator that a child is in danger and needs help. Many possible voices may be used, including preprogrammed accents, funny voices, joke reminders and/or any other unusual voice that would cause the vehicle operator or driver to pause regardless of their stress level. A speaker directly connected to a voice card may be activated by a combination between a relay and the system operator 21 or a speaker connected directly to the system operator if a voice card is applied to it, depending on the specific electrical specifications of the vehicle.

Figure 11:
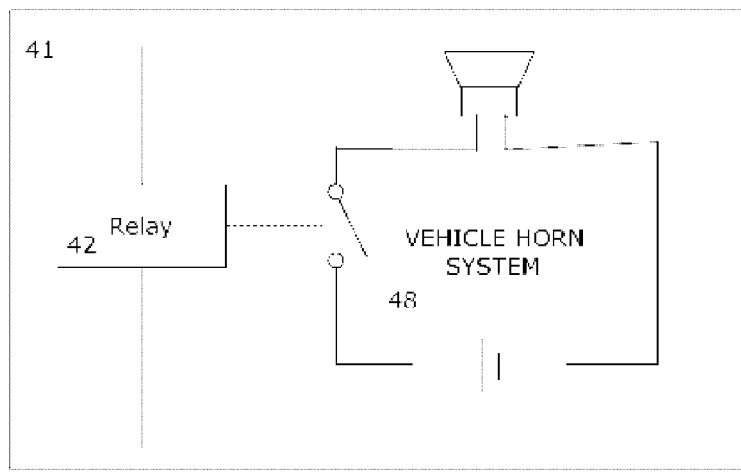
FIG. 11 shows the vehicle horn system connection with other system circuits, according to an exemplary embodiment of the invention.
Figure 12:
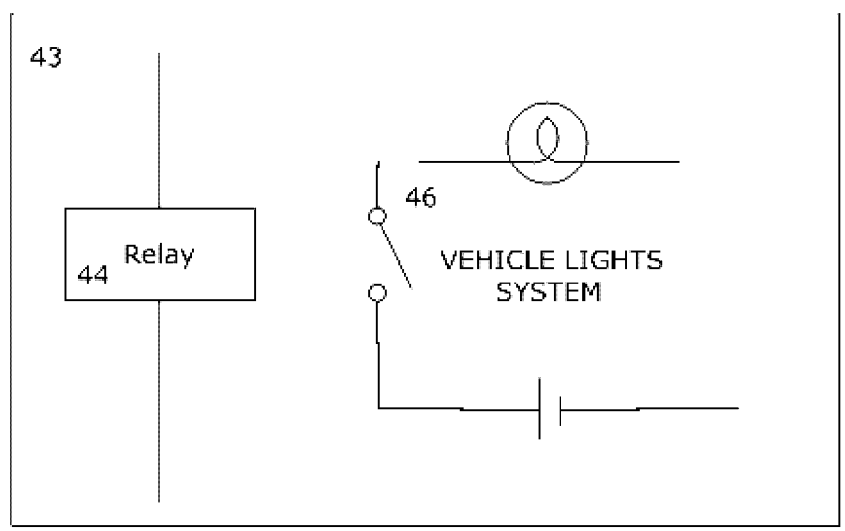
FIG. 12 shows the vehicle lights system connection with other system circuits, according to an exemplary embodiment of the invention.

As seen on FIG. 11, in one embodiment, the sound alarm device may be the vehicles horn 48 being connected to the system operator processor 21. Such a system could be activated by a relay mechanism as commanded by the system software. The vehicle lights 43 connection the system processor 21, can be seen on FIG. 12 in an embodiment where it is connected to a relay 35 that completes the vehicles light signaling as commanded by the system software.

Other embodiments may allow the proposed alarm system to be; modified to smart key vehicles; have a GPS system added to alert the authorities about the vehicle location; modified to open the vehicle windows partially/totally (in cases where the occupant is expected to be a pet); have the system activate the ventilation, heating or cooling system (particularly in hybrid vehicles although it may include starting the engine on automatic transmission vehicles); not only unlock, but activate the door opening functions automatically; alert a vehicle communication system (such as OnStar) and or place a call, SMS text or Internet message to one or more designated person(s) via the vehicle's or nearby WiFi connections. Interfacing with phone, smartphones, computers or tablets may provide a cost effective mobile solution (3G/4G connections to these devices may be available for $10/month under some plans).

Other enhancements may include a status/diagnosis indicator (via LED or other interface) to ensure that the seat sensor is functional; a tactile/haptic sensor/actuator may be added to the steering wheel and/or the driver's seat. By being a central system, the system taught here allows for the connection/installation of sensors in one or more vehicle seats, booster seats, child seats and/or pet carriers or areas. In addition, the system may be implemented using sensors in the original vehicle seats (an aid for the handicapped). Simple DSP devices, such as a crying baby sound detector could be also implemented and interfaced to the system. In one embodiment, the detection sensors 45, 49, 51 may be any of a variety of sensors, from one or more manufacturers, including pads, weight, movement, touch and other sensors. In one embodiment, the passenger sensors are removable, allowing the transition of the system as the vehicle owner needs change.

In operation, the instant detection of the key removal from the ignition while one or more passengers are detected within the vehicle, could trigger the opening of the locks and the initiation of the various visual and vehicle cabin alarms. Similarly, while the alarm is active, the power lock "locking" function may be disabled, and/or the doors unlocked, leaving full access to the vehicle.

In an alternate embodiment, when the user attempts to use the remote lock, the doors will remain unlocked, and a different feedback sound by the vehicle may be triggered (one not used normally). In addition, when the alarm goes off because of the sensed presence of a child/pet, the alarm may not be deactivated remotely (through the key FOB), but instead will require opening of the vehicle doors. Once the passenger is removed, the system will transition to a 'normal' state, allowing all traditional remote lock operations and returning all activated vehicle systems (alarms, lights, A/C, engine) to return to their off position.

The number of sensors may be nearly unlimited, allowing for the system to operate with cars, SUV's and minivans (1 to 6 possible child seat sensors), but also with buses or Daycare center vans (10+) at minimal incremental costs.

Other embodiments of the system include an interior warning signal advising that the system will be activated, allowing an unaware adult caring for a child to deactivate the alarm. Similarly, if there are passengers in danger, and the driver closes his/her door, a brief outside sound may provide a warning.

EXAMPLE

In one embodiment, the system may operate as described here. The warning system is implemented as a separate electronic system which interfaces with sensors and status indications both outside and inside and outside the vehicle where a helpless occupant is locate. In an alternate embodiment, one or more of the system functions may be implemented in the original vehicle computer system.

One or more removable sensors are used to detect the helpless occupant or passenger in the rear area of the vehicle, where the one or more sensors are connectable to the system. There may be more than one connector per child seat, so that more than one passenger and/or more than one mode of detection of the passenger may be accomplished.

The driver is monitored through at least two sensors, some of which may be built into the vehicle, and thus may be monitored through a connection to the vehicle status interface. These sensors include a "key in the ignition" sensor/signal (to know the driver has or has not entered/removed the key to start/stop the vehicle or car), and a second sensor in the carpet, seat or seat belt mechanism, to know the driver is still within the vehicle, weight sensor (whether OEM vehicle supplied or after market). Thus, when any one of these sensors detects that the driver leaving the vehicle while the monitored helpless occupant is still sensed within the vehicle, the system will enter a warning or alert stage. Such a warning stage will in one embodiment, open the door locks while simultaneously disabling the ability to lock them.

When in the warning or alert phase, the system will activate a visual warning in the "dash board" and a sound inside the vehicle to warn the driver what happens before you leave your vehicle. In addition, the FOB or "beeper" is disabled so that it cannot either activate the monitoring system and/or vehicle theft, nor remotely lock the doors when the system is in said warning or alert status. In short, the system knows the driver has/plans to exit the vehicle, and while the helpless occupant remains within the vehicle, it'll do everything so that the driver is forced to remove said helpless occupant and/or be alerted to its presence. In this fashion, every time the user tries to use the FOB to lock the doors, the vehicle horn, lights, buzzer or pre-recorded/computer generated voice or sounds (e.g. a voice annunciator saying 'child') will activate in a non-normal fashion (say three horn beeps instead of the customary one), so that the driver realizes the helpless occupant is within the vehicle.

If the system remains in such alert or warning mode for more than a pre-determined or programmable amount of time (e.g. more than 1 minute and 20 seconds) this will activate the alarm PiD, which will activate the vehicle's horn, special speaker, voice, etc. using a sound that while still different from the anti theft alarm (to avoid confusion) will now be loud/insistent enough to recall the operator to the vehicle and/or call attention to it. If the alarm activates as described above, it will not stop until the helpless occupant deactivation signal is given. In the case of a child seat, this will require removing the child from the vehicle, or occupying the driver's seat again (and inserting the key), etc. If the alarm continues without response from the driver, the windows may be lowered a few inches to create air flow (as an option). If the occupant was a child, upon removing the child from the vehicle the system returns to normal and restores functions such as remotely locking door locks, etc.

If there was no helpless occupant detected, system works as a traditional anti theft system, however the system has been designed to prevent its use against itself. In this fashion, when the system detects the request to activate the alarm, and senses that the passenger has been successfully removed or was not there, the system passes from either the warning stage or the disarmed stage to the armed stage upon the passing of a programmable amount of time (from zero (instantaneous) to say 10 seconds or two minutes). If after that amount of time has passed, the helpless occupants are detected as occupied, the system will activate the theft alarms, but not unlock the doors. In this fashion, burglars may not trick the vehicle to unlock the doors by simply snaking a clothe hanger or other wire and pushing on the child seat (which otherwise would trigger the warning condition described above).

The vehicle sensors that are envisioned include cabin sensors to detect, motion, weight on a seat, touch of surfaces, cabin temperature, infrared, lasers, light, sound, etc. In effect, any customer preference is compatible. The above sensors may be used to monitor helpless passenger and also for monitoring burglary attempts after finding that there is no danger to passengers and activate the alarm. In addition, the FOB or alarm beeper will additionally open and close the doors automatically and perform any other OEM vehicle FOB functions.

CONCLUSION

In concluding the detailed description, it should be noted that it would be obvious to those skilled in the art that many variations and modifications can be made to the preferred embodiment without substantially departing from the principles of the present invention. Also, such variations and modifications are intended to be included herein within the scope of the present invention as set forth in the appended claims. Further, in the claims hereafter, the structures, materials, acts and equivalents of all means or step-plus function elements are intended to include any structure, materials or acts for performing their cited functions.

It should be emphasized that the above-described embodiments of the present invention, particularly any "preferred embodiments" are merely possible examples of the implementations, merely set forth for a clear understanding of the principles of the invention. Any variations and modifications may be made to the above-described embodiments of the invention without departing substantially from the spirit of the principles of the invention. All such modifications and variations are intended to be included herein within the scope of the disclosure and present invention and protected by the following claims.

The present invention has been described in sufficient detail with a certain degree of particularity. The utilities thereof are appreciated by those skilled in the art. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

The invention claimed is:

1. A vehicle having a helpless occupant and vehicle alarm system comprising:
   one or more vehicle conditions sensors;
   a system operator processor unit for installation on said vehicle, wherein said system operator unit is interfaced electrically with said one or more vehicle conditions sensors, said system operator unit is monitoring said one or more vehicle condition sensors and executing one or more pre-programmed action sequences in response to said sensors;
   a portable remote pager unit in communication with said system operator processor unit, said portable remote pager unit being capable of encrypting said portable remote pager unit communication signals, and being capable of activating the alarm system, disabling the alarm system or activating a panic mode, providing visual and/or aural messages to operator;
   electric circuitry control means for isolating the vehicle's power door lock circuitry from the vehicle's control, wherein upon activation of said electric circuit control means, said system operator processor unit exclusively controls said door locks; and
   system electronic control means capable of discerning between helpless occupants alarms and vehicle theft situations and activating various system features accordingly; and
   wherein said system operator processor unit is capable of detecting when one or more helpless occupant sensors are triggered and discerning if this happened after a programmable amount of time has passed during which said vehicle was sensed to be unoccupied, wherein said system operator processor unit responds as in a theft event.

2. The system of claim 1 wherein said vehicle condition sensors comprise;
   one or more removable sensors connectable to one or more seats in order to detect the presence of an occupant on said seat.

3. The system of claim 2 wherein;
   said seats are comprised of child seats.

4. A helpless occupant and vehicle alarm protection method, said method comprising:
   providing one or more vehicle conditions sensors in a vehicle;
   installing a system operator processor unit on said vehicle, interfacing said system operator unit electrically with said one or more vehicle condition sensors, wherein said system operator unit monitors the said one or more vehicle condition sensors and executes one or more pre-programmed action sequences in response to said vehicle condition sensors;
   providing a portable remote pager unit in communication with said system operator, processor unit, said portable remote pager portable unit being capable of encrypting said communication signals, and being capable of activating the alarm system, disabling the alarm system or activating a panic mode, providing visual and/or aural messages to operator;
   installing electric circuitry control means for isolating the vehicle's power door lock circuitry from the vehicle's control, wherein upon activation of said electric circuit control means, said system operator processor unit exclusively controls said door locks; and
   providing system electronic control means capable of discerning between helpless occupants alarms and vehicle theft situations and activating various system features accordingly; and
   wherein said system operator processor unit is capable of detecting when one or more helpless occupant sensors are triggered and discerning if this happened after a programmable amount of time has passed during which said vehicle was sensed to be unoccupied, wherein said system operator processor unit responds as in a theft event.

5. The method of claim 4 wherein said vehicle condition protection method comprises;
   providing one or more removable sensors connectable to one or more seats in order to detect the presence of an occupant on said seat.

6. The method of claim 5 wherein;
   said seats are comprised of child seats.

* * * * *